United States Patent [19]

Brunsden

[11] 4,255,021
[45] Mar. 10, 1981

[54] OPTICAL DEVICE WITH CONICAL INPUT AND OUTPUT PRISM FACES

[75] Inventor: Barry S. Brunsden, Chicago, Ill.

[73] Assignee: The United States of America as represented by the United States Department of Energy, Washington, D.C.

[21] Appl. No.: 31,809

[22] Filed: Apr. 20, 1979

[51] Int. Cl.³ .............................................. G02B 5/04
[52] U.S. Cl. .................... 350/286; 350/96.15
[58] Field of Search ............... 350/89, 87, 17, 286, 350/287, 189, 96.1, 96.15, 96.19, 169, 170, 172, 162 SF

[56] References Cited

U.S. PATENT DOCUMENTS

| | | | |
|---|---|---|---|
| 2,594,757 | 4/1952 | Fischer | 350/89 |
| 2,881,654 | 4/1959 | Toffolo | 350/286 |
| 2,882,784 | 4/1959 | Toffolo | 350/286 |
| 3,161,717 | 12/1964 | Barabas et al. | 350/89 |
| 3,370,502 | 2/1968 | Wilks | 350/96.1 |
| 3,547,526 | 12/1970 | Devereux | 350/286 |
| 3,663,090 | 5/1972 | Miller | 350/189 |
| 3,832,030 | 8/1974 | Gloge | 350/189 |
| 4,129,358 | 12/1978 | Wei | 350/286 |

FOREIGN PATENT DOCUMENTS

| | | | |
|---|---|---|---|
| 257979 | 3/1963 | Austria | 350/286 |
| 279733 | 11/1930 | Italy | 350/287 |
| 12445 | 3/1919 | United Kingdom | 350/286 |

OTHER PUBLICATIONS

Bryngdahl, Olof, J. Opt. Soc. Am., 60, Jul., 1970, pp. 915–917.
Lavoie, Louis, Appl. Opt., vol. 14, No. 7, Jul., 1975, pp. 1482–1484.
Mielenz, Von K.-D., "Theorie des Hufner-Rhombus", book unknown, pp. 404–408, 1955.

*Primary Examiner*—Jon W. Henry
*Attorney, Agent, or Firm*—James W. Weinberger; Frank H. Jackson; Donald P. Reynolds

[57] ABSTRACT

A device for radially translating radiation in which a right circular cylinder is provided at each end thereof with conical prism faces. The faces are oppositely extending and the device may be severed in the middle and separated to allow access to the central part of the beam. Radiation entering the input end of the device is radially translated such that radiation entering the input end at the perimeter is concentrated toward the output central axis and radiation at the input central axis is dispersed toward the output perimeter. Devices are disclosed for compressing beam energy to enhance drilling techniques, for beam manipulation of optical spatial frequencies in the Fourier plane and for simplification of dark field and color contrast microscopy. Both refracting and reflecting devices are disclosed.

11 Claims, 16 Drawing Figures

OPTICAL DEVICE WITH CONICAL INPUT AND OUTPUT PRISM FACES

CONTRACTUAL ORIGIN OF THE INVENTION

The invention described herein was made in the course of, or under, a contract with the UNITED STATES DEPARTMENT OF ENERGY.

BACKGROUND OF THE INVENTION AND PRIOR ART STATEMENT

Optical devices inverting images are not new nor are optical devices for providing low, high or band pass filters for beam manipulation of optical spatial frequencies in the Fourier plane. Nevertheless, in many instances it is very difficult to operate on or otherwise alter the center of a beam of radiation, whether it be optically visible or otherwise, without distorting the beam. This holds true not only in the aforementioned filters for manipulation of the optical spatial frequencies in the Fourier plane but also in such fields as dark field or color contrast microscopy. To this date, although it is old to alter beams of optically visible light and to operate on the periphery of these beams, it has been difficult to reach the center of a beam of substantially parallel radiation without distorting the beam.

Radial translation in the sense of the present invention denotes a phenomenon in which the center of a beam of radiation is moved outwardly toward the periphery or perimeter of the beam and the perimeter or pheriphery of the beam is moved toward the center. The result of this new phenomenon is to concentrate intensity of a beam of substantially parallel radiation toward the center of the radially translated beam as well as to make available on the perimeter or periphery of the beam rays which were heretofore at the center of the beam.

Prior art which is pertinent in one respect or another to the present invention, copies of which are enclosed herewith include the Koester et al U.S. Pat. No. 3,670,260 directed to optical devices for altering the form and distribution of a laser beam; the Giallorenzi U.S. Pat. No. 3,743,383 directed to a system of prisms for superimposing several laser beams; the Burch et al U.S. Pat. No. 3,560,082 directed to an optical inverting system; a publication by John H. Mccleod in the August, 1954 edition of the *Journal Of The Optical Society Of America*, page 592, entitled "The Axicon: A New Type Of Optical Element"; a publication by John H. McCleod in the *Journal Of The Optical Society Of America*, volume 50, no. 2 February, 1960 entitled "Axicons And Their Uses"; a publication by Bryndahl in the *Journal Of The Optical Society Of America*, volume 60, no. 7 July 19, 1970 entitled *"Reversed-Radial-Shearing Interferometry"*; a publication by Peters and Leger in *Applied Optics*, volume 9, no. 6 published June, 1970, page 1435, entitled "Techniques For Matching Laser TEM Mode To Obscured Circular Aperture"; and a publication by Edmonds in *Applied Optics*, volume 12, no. 8 published August, 1973, page 1940, entitled *"The Reflaxicon, A New Reflective Optical Element, And Some Applications."*

SUMMARY OF THE INVENTION

This invention relates to a device and method for radially translating radiation wherein substantially parallel radiation entering at the input perimeter is concentrated toward the output central axis and radiation entering at the input central axis is dispersed toward the output perimeter.

An important object of the present invention is to provide a device for radially translating radiation comprising means having an input end circular in transverse cross section and an output end circular in transverse cross section for receiving substantially parallel radiation at the input end thereof and radially translating the radiation during passage thereof between the input end and the output end such that radiation at the input perimeter is concentrated toward the output central axis and radiation at the input central axis is dispersed toward the output perimeter.

Another object of the present invention is to provide a device of the type set forth including a conical input prism face transparent to the radiation, a conical output prism face transparent to the radiation, each of the input and the output prism faces having a perimeter circular in transverse cross section and a central axis, the input prism face and the output prism face oppositely extending and positioned apart a distance such that the radiation entering the input prism face at the perimeter thereof is concentrated toward the output prism face central axis and radiation entering the input prism at the central axis thereof is dispersed toward the output prism face perimeter.

Yet another object of the present invention is to provide a device of the type set forth including an input reflector having a circular cross section and a conical face, an output reflector having a circular cross section and a conical face, each of the input and the output reflectors having a common central axis, and reflecting means disposed about the input and the output reflectors, the input reflector and the output reflector oppositely extending and positioned with respect to the reflecting means such that the radiation received at the input reflector at the perimeter thereof is reflected by the reflecting means toward the output reflector central axis and radiation received at the input reflector at the central axis thereof is reflected by the reflecting means towards the output reflector perimeter.

Yet another object of the present invention is to provide a system for selectively separating portions of radiation from a beam of substantially parallel radiation having a beam central axis and perimeter comprising a conical input prism face transparent to the radiation, a conical output prism face transparent to the radiation and longitudinally spaced apart from the input prism face, both of the input and the output prism faces being symmetrically positioned about the beam central axis, each of the input and the output prism faces having a perimeter circular in transverse cross section and oppositely extending with respect to each other, and means associated with the prism faces for selectively separating portions of the radiation beam at the beam perimeter and adjacent thereto, the prism faces being longitudinally spaced apart a predetermined distance such that radiation entering the input prism at the perimeter thereof is concentrated toward the output prism face central axis and radiation entering the input prism face at the central axis is dispersed toward the output prism face perimeter thereby radially translating the beam to permit access to the central portion of the original beam at the perimeter of the translated beam and adjacent thereto.

A further object of the present invention is to provide means and methods for manipulating beams of optical spatial frequencies in the Fourier plane, to provide low, high or band pass filters for optically visible light, to place an unsupported central stop in a beam or image and to select an annulus of variable size from a beam of substantially parallel visible light and to vary the intensity on the axis of a beam of parallel light, and to provide improvements in devices and methods of dark field microscopy and color contrast microscopy.

These and other objects of the present invention may more readily be understood by reference to the following specification taken in conjunction with the accompanying drawings, in which:

DESCRIPTION OF THE PREFERRED EMBODIMENT

As used herein, the term "radiation" means any electromagnetic or sound radiation but excludes particle radiation and therefore specifically includes both visual and nonvisual electromagnetic radiation. The devices disclosed hereinafter will alter any radiation entering the device in a parallel bundle along the lines substantially parallel to the axis of the device and capable of being refracted or reflected by the device. In all cases it is understood that the device itself must be constructed of materials with a refractive index different than the surrounding medium, in order that refraction, according to well understood principles will occur.

Figure 1:
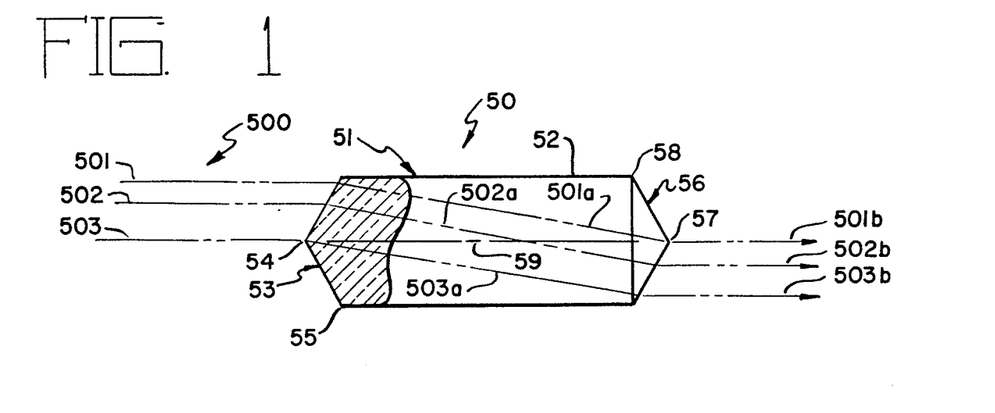
FIG. 1 is a side elevational view partially broken away of a one-piece integral device having outwardly extending conical prisms for radially translating radiation across the central axis.
Figure 6:
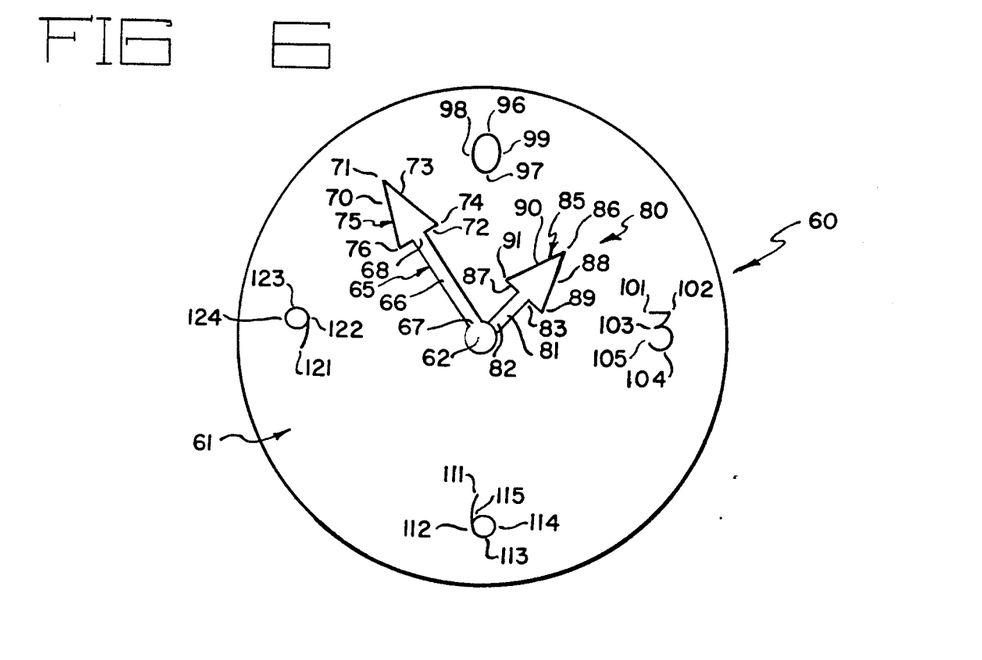
FIG. 6 is an elevational view of a clock face as seen at the input end of the device such as that illustrated in FIG. 1.
Figure 7:
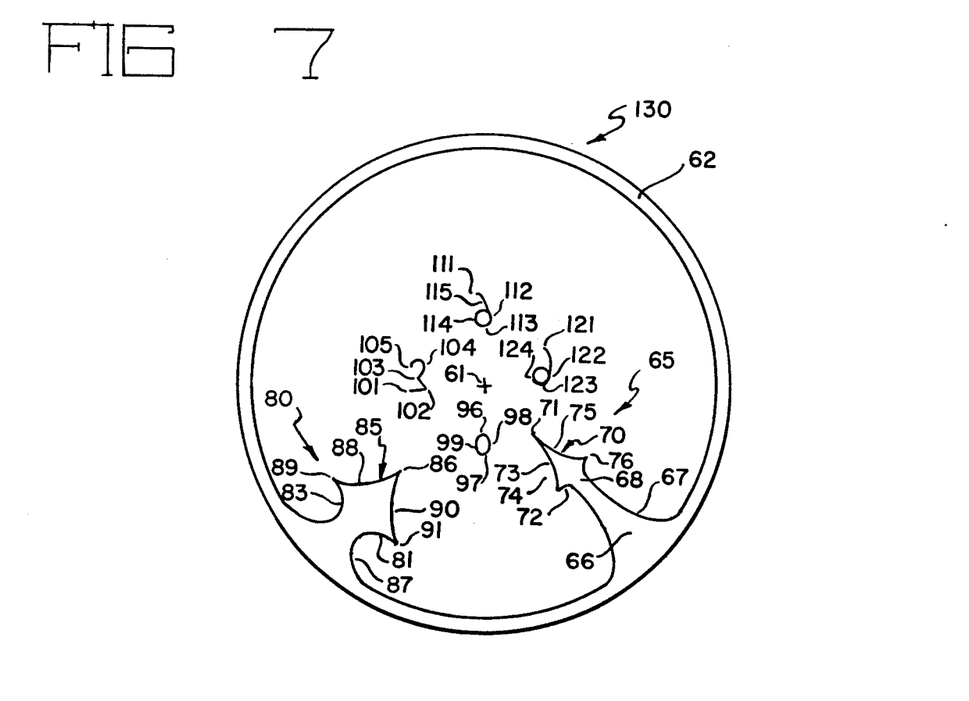
FIG. 7 is an elevational view of the image emitted from the output end of a device illustrated in FIG. 1 which is radially translated from the image illustrated in FIG. 6.

Referring now to the drawings and particularly to FIGS. 1, 6 and 7 thereof, there is disclosed a device 50 comprised of a right circular cylindrical body of material transparent to the radiation to be translated. Usually in the description of the present invention reference will be made to optically visible radiation, and therefore, the device 50 can be constructed of any material optically transparent and capable of refracting optically visible light, for instance any clear synthetic organic resin such as Lucite. The right circular cylindrical body 51 has an outer surface 52 and an input conical face 53 having an apex 54 and a perimeter 55 circular in transverse cross section. The device 50 has an output conical face 56 having an apex 57 and a perimeter 58 circular in transverse cross section. In this device 50, the input conical face 53 and the output conical face 56 are on a one-piece body 51, and the apexes 54 and 57 define a central axis 59 parallel to the outer cylindrical surface 52. Whether the outer cylindrical surface 52 is transparent to light is, for the present embodiment, immaterial.

A beam of light 500 is comprised of substantially parallel rays 501, 502 and 503, it being understood that these rays are merely representative of an infinite number of rays making up the beam 500. The beam 500 is directed substantially parallel to the central axis 59 of the device 50 which passes through both the apexes 54 and 57, respectively of the input face 53 and the output face 56. For purposes of brevity, the beam 500 is shown only as entering one half of the device 50, but it is readily understood that in usual practice the beam 500 will enter the device 50 at all points on the conical input face 53.

As seen, the ray of light 501 entering the conical face 53 at the periphery or perimeter 55 thereof is refracted by the input face 53 and is denoted by the designation 501a. The refracted ray 501a passes through the body 51 to the output conical prism face 56 wherein the ray 501a is refracted and now designated as 501b. The length of the device 50, and refractive index of the material and the angle of the conical faces 53 and 56 are factors used to design the device 50 such that the ray 501 striking the device 50 at the perimeter of the conical input face 53 is refracted exactly to the apex 57 of the output face 56 and emerges therefrom as a ray 501b parallel to the central axis 59. Similarly, a ray 502 striking the input face 53 at a point intermediate the perimeter 55 thereof and the apex 54 thereof is refracted at the surface of the conical face 53 and is designated as ray 502a and crosses the central axis 59 and emerges and is refracted at the face 56 and is designated as ray 502b. As seen, since the ray 502a crosses the central axis 59 of the device 50 the ray emerges in its refractive state 502b 180° from its entrance at the input face 53. Finally, the ray 503 which enters the conical input face 53 at the apex 54 thereof is refracted thereat and designated as 503a and emerges from the output face 56 at the perimeter thereof 58 and is designated as 503b. It is seen, that the ray 503 entering the exact apex 54 of the input face 53 is directed toward the perimeter 58 of the output face 56.

Although the above explanation is straightforward, it must be remembered that the device 50 is a right circular cylinder and therefore the rays 501 and 502 do not represent merely one ray but an infinite number of rays defining a circle of a selected radius on the conical input face 53. The rays 501 which impinge upon the perimeter 55 of the conican input face 53, are concentrated at the apex 57 of the output face 56, and this concentration is crucial to certain functions of the device 50 due to the inordinate and unexpected increase in intensity occasioned thereby. Similarly, rays 503 impinging at the apex 54 of the conical face 53 as well as rays adjacent thereto are directed toward the perimeter 58 of the output face 56 and are therefore dispersed from a single point or a circle of small diameter to a circle of larger diameter. The resultant decrease in intensity can also be usefully employed and the corresponding distortions or translations of images due to the transformation of the input beam to the output beam provides varied applications.

In order more clearly to understand the nature of the translation of an incoming beam of light, there is provided in FIGS. 6 and 7 a representation of a clock face and the translations which occur to the image thereof as it is translated from the input end 53 to the output end 56. Referring now to FIG. 6, there is disclosed an input image 60 of a clock face having a circular perimeter 61, and a central area 62. A minute hand 65 includes an elongated stem 66 having an end 67 at the central area 62 and terminating at a distal end 68 connected to an arrow 70 having a tip 71, an expanded straight line base 72, a leading edge 73. The point 74 indicates the juncture between the base 72 and the leading edge 73. The arrow 70 further includes a trailing edge 75 with reference numeral 76 designating the juncture between the base 72 and the trailing edge 75.

Similarly, the input image 60 has an hour hand 80 having an elongated stem 81 joining the center 62 at a point 82 and terminating at a point 83 which joins an arrow 85 having a tip 86, an elongated base 87 interconnected to the tip 86 by the leading edge 88 and trailing edge 90. The reference numeral 89 designates the juncture between the leading edge 88 and the base 87 and the reference numeral 91 indicates the juncture between the trailing edge 90 and the base 87.

The input image 60 further includes at the normal 12 o'clock position a numeral 0 having reference points 96, 97, 98 and 99 spaced at 90° intervals. The input image 60 further includes the numeral 3 at the normal 3 o'clock position with the reference numerals 101 and 102 designating end points of the top horizontal leg, the reference numeral 103 designating the end of the straight angular leg, the reference numeral 104 designating the bottom most part of the arcuate curved surface of the numeral and the reference numeral 105 indicating the end of that arcuate portion. Similarly the reference numeral 6 includes the reference point 111 at the top most portion of the numeral, the numeral 112 designates the juncture between the downstroke portion and the loop portion of the numeral, the reference numeral 113 designates the bottom most portion of the arcuate loop, the reference number 114 designates the right-hand most portion of the loop, and the reference numeral 115 designates the internal junction between the loop and the downstroke line of the numeral. Similarly the reference numeral 9 has reference numeral 122 designates the juncture between the juncture between the loop and the straight line, the reference 123 represents the uppermost part of the arcuate loop and reference numeral 124 designates the left-hand most part of the loop.

Referring now to the output image 130 illustrated in FIG. 7, it is seen that the center portion 62 of the input image 60 has been translated to form the perimeter of the output image 130 and the perimeter 61 of the input image 60 has now become the central axis point 61 in the output image 130. The minute hand 65 has been translated 180° and is reverse reading and distorted such that the arrow 70 now points toward the center rather than the periphery; however, this is consistent since in the input image 60 the arrow 70 pointed toward the perimeter 61 and in the output image 130 the arrow 70 still points toward the input perimeter 61 which is now the output central axis 61. The stem 66 is no longer of uniform width since the end 67 now must be expanded to occupy a much greater arcuate extent as was the central portion 62 of the input image 60 which is now the perimeter of the output image 130. The arrow 70 is now inwardly facing rather than outwardly facing the leading edge 73 has now been reversed and rather being a straight line it is now arcuate and similarly the trailing edge 75 has been reversed and is also arcuate. The base 72 of the arrow 70 is also arcuate now rather than straight and the distance between the points 74 and 76 which in the input image 60 defined the length of the base 72 now is smaller than in the input image and of course as previously mentioned is arcuate rather than straight.

In general, lines closer to the center of the input image become more distorted at the output image. This is apparent when one considers the differences between the hour hand 80 of the input image 60 and hour hand 80 of the output image 130. Specifically, the arrow 85 is now inwardly facing and the distortions of both the stem 81 and the base 87 of the arrow 85 are more pronounced since the arrow 85 of the minute hand 80 was closer to the center of the input image 60 and the previously described arrow 70 of the minute hand 65. In other respects, the translations for the hour hand 80 are the same as for the minute hand 65, however they tend to be more severe for those lines closer to the center of the input image 60.

Referring now to the numerals 0, 3, 6 and 9, it will be apparent that the numeral 0 has been rotated 180° and is now reverse reading and also upside down, as is apparent from an inspection of the reference numerals thereof. Similarly, the other numerals 3, 6 and 9 have also been rotated 180°, vertically inverted and are now reverse reading, all in conformance with the translations previously described.

Figure 8:
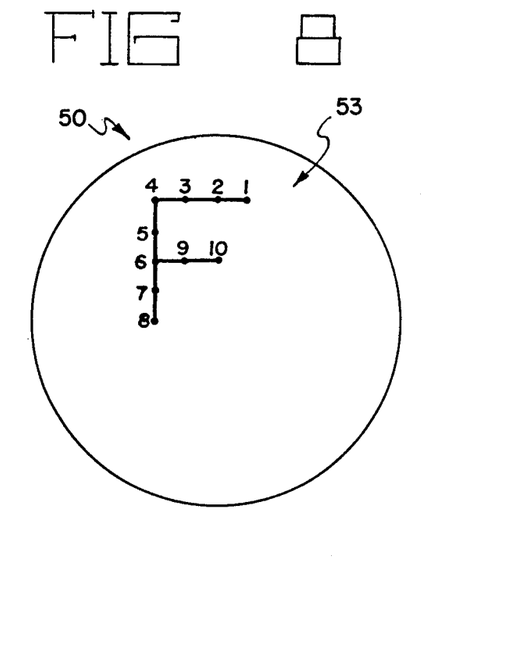
FIG. 8 is an elevational view of the letter "F" as viewed at the input end of a device of the type illustrated in FIG. 1.
Figure 9:
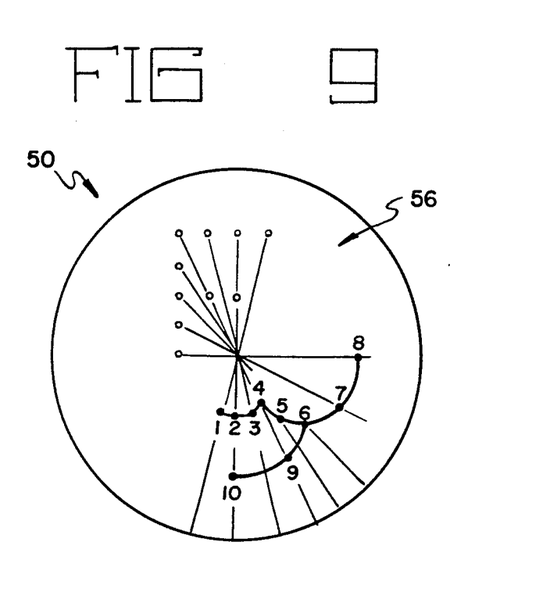
FIG. 9 is the radially translated image of the letter "F" illustrated in FIG. 8 as seen at the output end of a device such as illustrated in FIG. 1.

Additionally, reference to FIGS. 8 and 9 will show the translations for an image of the letter "F" as viewed, in FIG. 8 at the input end 53 of the device 50 and as viewed in FIG. 9 at the output end 56 of the device 50. Each reference point is rotated 180° and the distance between the input center and the reference point is translated to the distance between the output perimeter and the reference point 180° displaced.

Figure 2:
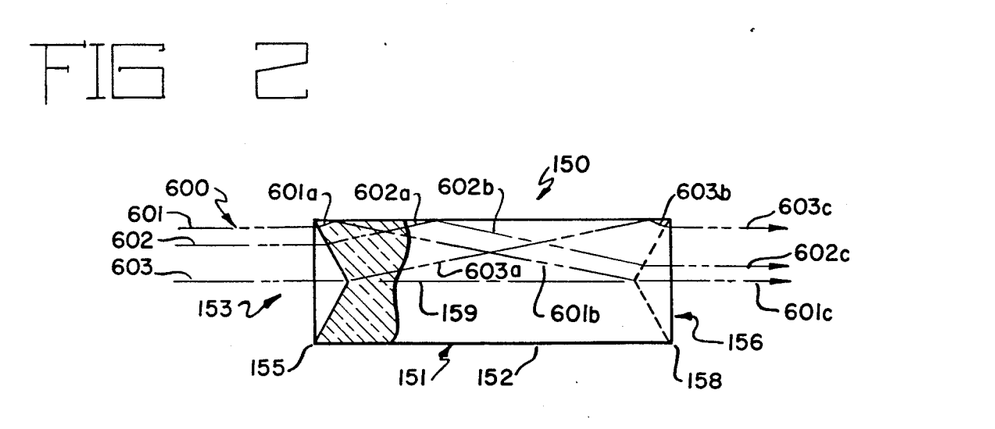
FIG. 2 is a side elevational view partially broken away of a second embodiment of the device illustrated in FIG. 1 for radially translating radiation by refraction and reflection without crossing the central axis.

Referring now to FIG. 2 of the drawing, there is disclosed a second embodiment of the translating device 50 previously discussed. The embodiment 150 in FIG. 2 is also constructed of a material transparent to the desired radiation and is a right circular cylinder 151 having an outer cylindrical surface 152 and an input conical face 153. The conical face 153 is an inwardly extending cone having an apex 154 and a perimeter 155 circular in transverse cross section. The device 150 has an output end 156 which is an inwardly extending cone having an apex 157 and a perimeter 518 circular in cross section. Since the device 150 is in one-piece, the apexes 154 and 157 define a central axis 159 parallel to the outer cylindrical surface 152. The device 150 operates not only by refraction as does device 50 but also by reflection, whereby it is necessary that the outer cylindrical surface 152 be reflective to the selected radiation. If the device 150 is a synthetic organic resin transparent to optical light, the surface 152 may be polished so as to become light reflective. This is merely one suggestion for optical light, and certainly, other known alternatives may be used for radiation other than optically visible electromagnetic radiation.

Since the input face 153 and the output face 156 of the device 150 are inwardly extending, the device operates by both refraction and reflection. A beam 600 is comprised, for brevity of a description only, parallel rays 601, 602 and 603. As each ray enters the prism or cylindrical body 150 through the input face 153 thereof the ray is refracted towards the outer surface 152, and this holds true whether the ray from the beam 600 is at the periphery as is ray 601 or at the central axis 159 as is ray 603. The refractive index of the material from which the device 150 is made along with the length of the device and the conical angles of the faces 153 and 156 are considered in fabricating the device 150 so that a ray 601 entering the face 153 is refracted toward the outer surface 152 (601a) until it contacts the outer surface 152 and thereafter it is reflected (601b) toward the output face 156 where it is refracted (601c) out of the device in a direction parallel to the original ray 601, but radially displaced. As before stated with respect to the device 50 the paramaters are selected such that a ray entering at the perimeter of the input face 153 exits the device 150 at the central axis 159 or at the apex 157 of the output face 156. Similarly, a ray 602 which is intermediate the perimeter 155 and the apex 154 of the input face 153 is refracted (602a) toward the outer surface 152 and then reflected (602b) toward the output face 156 where it is refracted (602c) parallel to the original entering ray 602. Finally, the ray 603 which enters the input face 153 at the apex 154 is refracted (603a) toward the outer surface 152 and thereafter in contact therewith is reflected (603b) toward the outer face 156 where it is refracted (603c) out of the device 150 in a direction parallel to the entering ray 603. Again, a ray entering along the apex 154 of the input face 153 exits the output face 156 at the perimeter 158 thereof and a ray entering the perimeter is of the input face 153 exits the output face 156 at the central axis 157 thereof.

The radial translations effected by the device 150 are similar to but not exactly the same as the translations of the device 50. As is apparent from an inspection of the FIGS. 1 and 2, it is seen that the rays entering the device 150 are refracted, reflected and refracted but never cross the central axis 159 of the device; whereas, rays entering the device 50 are refracted when they enter and refracted when they leave the device and cross the central axis 59. The net result of this difference for the devices 50 and 150 is that the translations illustrated in FIGS. 7 and 8 for device 50 will be the same for device 150, assuming that the length, diameter, conical angles and refractive index of the materials of the devices are the same, except that the output image 130 will be rotated 180° from that illustrated in FIG. 8. In other respects, the movement from the periphery of the input image to the center of the output image and movement from the center of the input image to the periphery of the output image will be the same. Also, the decrease in vertical extent of images close to the periphery of the input will also remain the same for the device 150 as was the case in the device 50.

Figure 3:
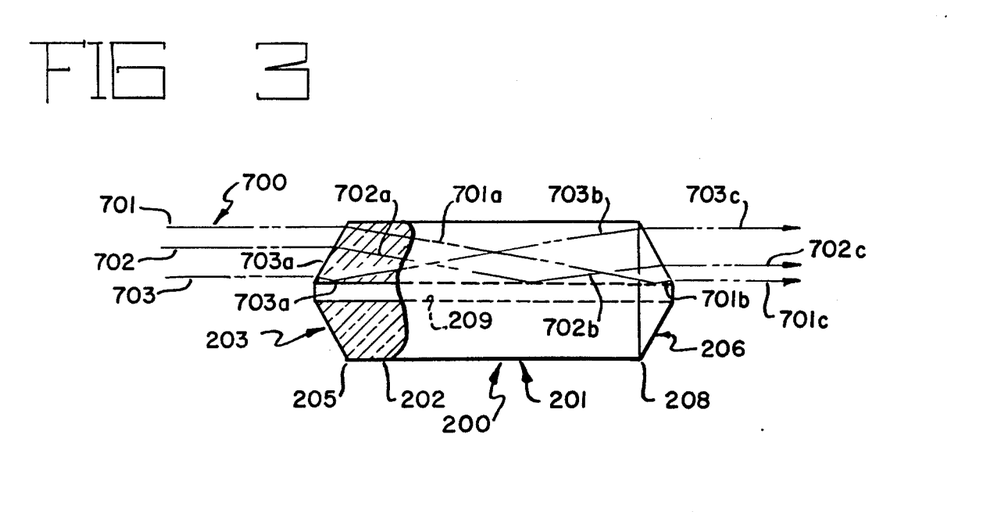
FIG. 3 is a side elevational view partially broken away of another embodiment of the device illustrated in FIG. 1 for radially translating radiation by both refraction and reflection without crossing the central axis.

Referring now to FIG. 3 there is yet another embodiment of the present invention which operates similarly to both FIGS. 1 and 2 and as somewhat of a combination thereof. A device 200 is illustrated in which a right circular cylindrical body 201 has an outer cylindrical surface 202 and an input conical face 203 which is outwardly extending and has a perimeter 205 circular in cross section. Similarly, there is an output face 206 which is conical and outwardly extending and has a perimeter 208 circular in cross section. The apexes of the conical input face 203 and the output 206 are aligned and define a central axis not shown because of an aperture 209 which extends entirely through the cylindrical body 201 and has a highly polished interior surface thereof. Because the interior surface of the aperture 209 is highly polished, individual rays of a light beam 700 entering the input conical face 203 are refracted toward the central axis of the device but cannot cross the central axis due to the reflective inner surface of the aperture 209. Therefore, reflection takes place along the aperture 209 resulting in a translation identical to that of the device 150. For a ray 701 entering the input face 203 near periphery 205 thereof the refraction (701a) is such that the ray strikes the aperture 209 adjacent the surface of the output face 206 and is reflected there (701b) to be emitted from the device 200 by refraction (701c) in a direction parallel to but radially spaced from the ray 701. Other rays such as rays 702 and 703 first are refracted (702a and 703a) respectively and then are reflected by contact with the polished aperture 209 (702b and 703b) respectively, translated positions previously described with respect to the device 150 by refraction at the face 206 as rays 702c and 703c.

Usually for the devices illustrated in FIGS. 1, 2 and 3 the conical angles of the input face and the output face will be exactly the same and this is because the devices are integral or one-piece, whereby it is necessary for the conical angles of the faces to be the same in order that the output beam be parallel to the input beam, although radially translated. As will be seen hereafter, if the input end and the output end of the device are physically separated into two distinct prisms, then it will be possible to construct a device wherein the indices of refraction for the input conical face and the output conical face need not be the same.

The input face and the output face have been referred to as conical faces and this must be made true in all cases. These faces are not lens faces in any way as curvature of the faces will destroy the desired and previously described translations. To the extent that other devices are available in the prior art which are physically similar to the present device, they will not operate with the same translations of radiation. It is critical to the operation of this invention that the conical faces be conical surfaces and not lenses and arranged in the unique configurations taught here.

Figure 4:
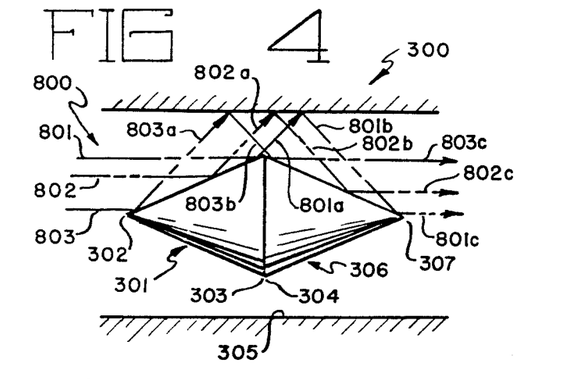
FIG. 4 is a side elevational view of another embodiment of the device disclosed in FIG. 1 wherein reflectors are used to radially translate radiation by reflection only without crossing the central axis.

Referring now to FIG. 4, there is disclosed an embodiment 300 which operates by reflection only. There is an input face 301 in the form of a cone having an apex 302 and a perimeter 303 which is circular in transverse cross section. There is also an output face 306 in the form of a cone having an apex 307 and a perimeter 304 which is also circular in transverse cross section and exactly equal in diameter to the abutting the perimeter 303. A cylindrical reflecting means 305 is spaced from the input and output reflectors 301 and 306 respectively and has a reflecting surface such that individual rays of a beam 800 entering the input reflector 301 and being reflected toward the reflecting means 305 are reflected therefrom toward the output face 306 where they are again reflected in a direction parallel to the input beam but radially translated, as previously discussed. In the present case a beam 801 entering the input face 301 near the perimeter thereof 303 is reflected (801a) toward the reflecting means 305 which in turn reflects the beam (801b) toward the output face 306 and particularly the apex 307 thereof where the beam is again reflected (801c) in a direction parallel to the input beam 801 but radially translated. Similar events occur for the ray 802 which is illustrated in the drawings as 802a, 802b and 802c, and similarly a ray 803 entering the input face 301 near the apex 302 thereof is denoted as 803a, 803b and 803c, it being understood that the beam 803c exits the output face 306 at the perimeter thereof.

Figure 5:
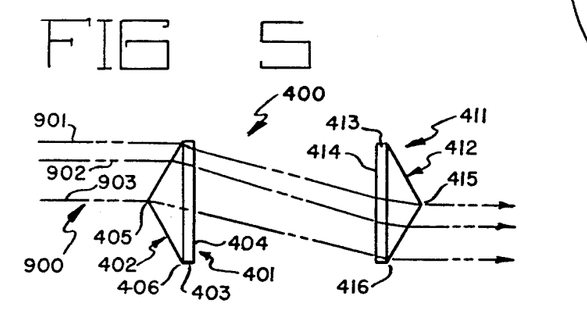
FIG. 5 is a side elevational view of a device similar to that illustrated in FIG. 1 wherein the central portion of the device is removed to permit ready access to the beam of radiation as it is being radially translated.

Referring now to FIG. 5 there is a device 400 which includes input prism 401 having an outwardly extending conical face 402 having an apex 405 and a perimeter 406 circular in transverse cross section. Extending from the perimeter 406 of the conical face 402 is a cylindrical body 403, also circular in transverse cross section, which terminates in a flat circular surface 404.

Spaced apart longitudinally from the input prism 401 is a separate and discrete output prism 411 having an outwardly extending prism face 412 with an apex 415 and a perimeter 416 circular in cross section. Extending inwardly from the perimeter 416 in a cylindrical body 413 terminating in a flat circular rear surface 414 which is parallel to and spaced apart from the surface 404. Usually, the prisms 401 and 411 will be made from the same material; however, it is possible with the prisms 401 and 411 being physically separate to construct the prisms of materials having different refractive indices which would require that the relationship between the prisms 401 and 411 be adjusted to compensate for the differences in the reflective indices.

A beam of light 900 entering the input prism face 402 is translated as hereinbefore described with respect to the device 50. Except that refractions occur at both surfaces 404 and 414, the net result of which being that the distance between the apexes 405 and 415 is less for the device 400 than for the device 50. In other respects, the operation of the device 400 is similar to that of the device 50 with each ray 901, 902 and 903 being refracted and crossing or approaching the central axis defined by the apexes 405 and 415 to produce a radial translation exactly similar to that illustrated in FIGS. 6, 7, 8 and 9. The advantage of the device 400 is that the prisms 401 and 411 are separate and distinct units which allow access to the interior of the refracted beam 900, thereby to permit several important and critical uses of the device 400, all as will be described later.

Figure 10:
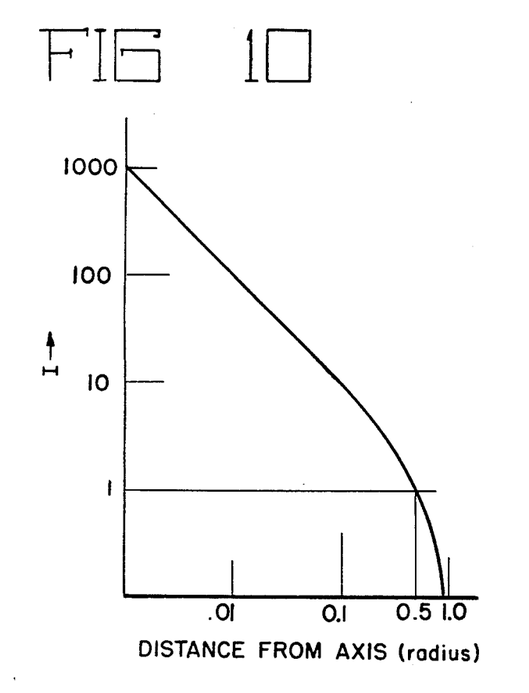
FIG. 10 is a graph illustrating the relationship between beam intensity and the distance from the axis (radius) for a beam of substantially parallel light translated by a device as illustrated in FIGS. 1–5.

In all cases heretofore described there is no lens action, that is the wave front for the radiation forms a conical shape, not a spherical shape, because the initial and final refracting or reflecting surfaces are conical and not spherical hence there is no lens action. This difference is critical to the operation of each device heretofore described. Itensity changes with the devices heretobefore described can be quite extreme. For example, a circular beam exactly translated as previously described, will have all the circumferential rays mapped on to the central rays former position and the former central rays be mapped on to the entire circumference. As previously noted, the results in intensity changes are significant and are illustrated in FIG. 10 in which the graph shows that the change in intensity of a circumference of any input radius is the ratio of the input radius to the output radius. This means that 50% of the input beam energy is contained in a column of the output beam with a cross sectional area of only 8.55% of the original beam. This holds true only when the beam is exactly translated as shown in each of the drawings herein described. Applications of this phenomenon for drilling small holes with laser beams is apparent.

Referring now to FIG. 11 through 14 there is described mechanism and systems utilizing the device 400 illustrated in FIG. 5 for producing high, low and band pass optical filters along with mechanism and systems applicable to dark field and color contrast microscopy. The systems hereinafter described also are applicable to image manipulation of optical spatial frequencies in the Fourier plane.

Figure 11:
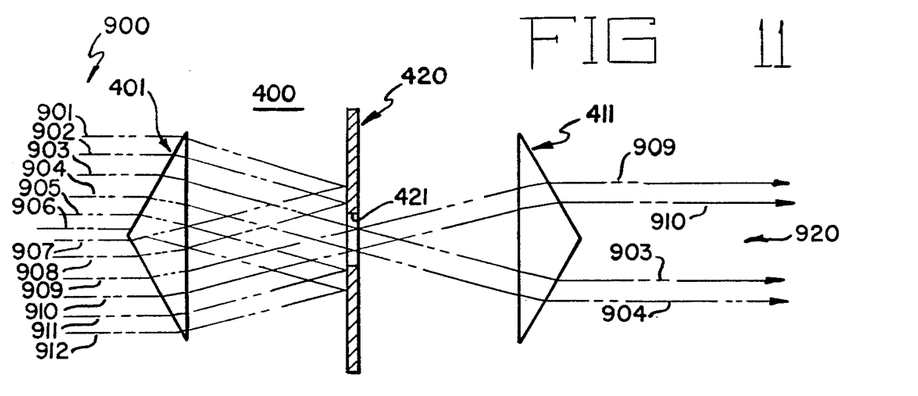
FIG. 11 is a schematic illustration of a system for filtering a beam of substantially parallel light to provide an annular beam at the output end.
Figure 12:
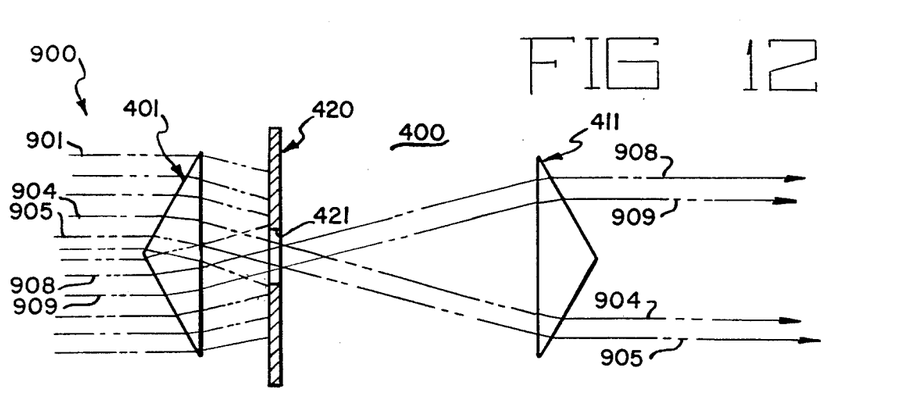
FIG. 12 is a schematic illustration like FIG. 11 showing variation in the diameter of the annulus formed at the output by varying the position of the filter intermediate the prisms.

Referring specifically to FIG. 11, there is disclosed the split or discrete prism device 400 for separating portions of the beam 900. In this illustration a plate 420 is positioned intermediate the input prism 401 and the output prism 411, the plate being provided with an aperture 421 therein. It is clear barriers can be used with any desired design, but a single aperture is used for illustrative purposes only. As seen, the rays forming both the center and the periphery of the input beam 900 are blocked by the plate 420 with only annular portions of the input beam passing through the aperture 421 and thereafter through the output prism 411 to form an output beam 920 annular in transverse cross section. As seen from the drawings wherein the individual rays of the input beam 900 are numbered consecutively from 901 to 912, this being for purposes of representation only, the rays 901 and 902 are selectively separated from the periphery as are the rays 911 and 912, due to the diameter of the aperture 421 being less than the diameter of the beam at the plane of the plate 420. Also, the central portion of the incoming beam 900 defined by the rays 905, 906, 907 and 908 are also effectively removed by the shield 420, thereby passing or retaining only rays 903 and 904 and rays 909 and 910 to form the output beam 920. The diameter of the aperture 421 determines the width of the output beam annulus 920, and as seen by the difference between the location of the shield 420 in FIGS. 11 and 12, the position of the shield 420 with respect to the input prism 401 determines the diameter of the output beam 920, and hence which frequencies are passed.

The placement of a shield 420 intermediate the input prism 401 and the output prism 411 provides a band pass filter for optically visible radiation of substantially parallel bundles of light having the frequencies of radiation varying radially of the beam, wherein intermediate frequencies are passed but the high and low frequencies are separated. This is true because at the optical Fourier plane high spatial frequencies tend toward the periphery of the beam and low spatial frequencies tend to be along the beam central axis. This frequency gradient is usefully employed to construct band pass filters. With the device of the present invention even the difficult to reach low frequencies are easily manipulated by radially translating the low frequencies to the perimeter of the beam.

Figure 13:
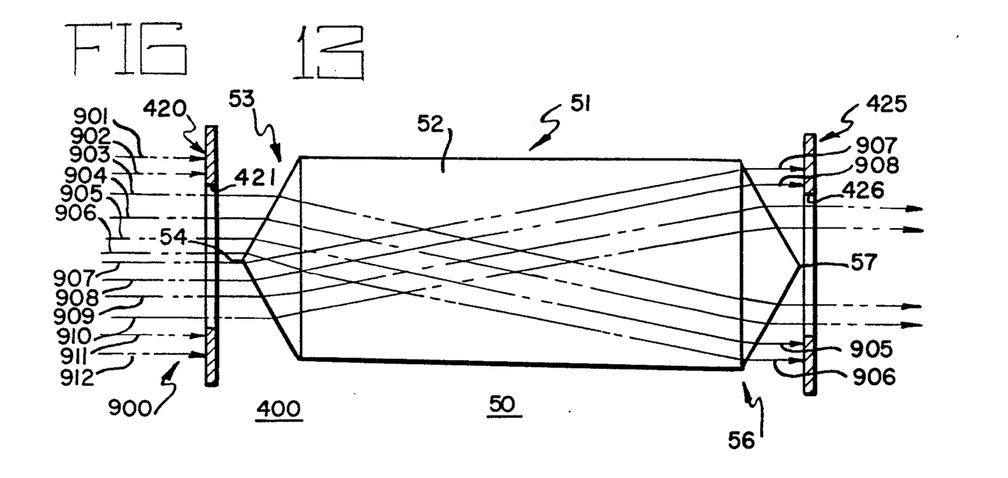
FIG. 13 is a schematic illustration of a band pass filter.

Referring now to FIG. 13, there is shown a device 50 of the type illustrated in FIG. 1 having like reference numerals applied to like portions. In this instance, a shield 420 having a relatively large aperture 421 therein is positioned intermediate the input prism 53 and a source of the beam 900. The aperture 421 is slightly smaller than the diameter of the input prism 53. A shield 425 having an aperture 426 therein is positioned exteriorly of the output prism face 56 and intermediate the device 50 and the ultimate viewer. As seen from the drawings the incoming beam 900 comprised of rays 901 to 912 encounters the filter or diaphragm 420 which eliminates the high frequency rays 901, 902, 911 and 912. The remainder of the rays 903 to 910 are transmitted through the shield aperture 421 and refracted by the input prism face 53. The rays are translated across the central axis of the device 50 as defined by cone apexes 54 and 57 and emerge from and are refracted by the output prism face 56. Placement of the shield 425 exteriorly of the output prism face 56 results in blocking or selectively removing the low frequency rays 905, 906, 907 and 908, thereby leaving the mid frequency rays 903, 904, 909 and 910. As seen, the shield 420 with the aperture 421 therein is a low pass filter that is passing low and medium frequency radiation and blocking high frequency radiation. The shield 425 having the aperture 426 therein is a high pass filter blocking the low frequency radiation and passing the medium and high frequency radiation, so that the combination of shields 420 and 425 is a band pass filter for mid range frequencies. For instance, if only shield 420 were present, then only the high frequency radiation of rays 901, 902, 911 and 912 would be prevented from passing through the device 50 and in fact an annulus would be produced at the output prism face 56 comprised of mid and low frequency radiation. Conversely, if the shield 420 were not present and only the shield 425 were present then only the low frequency radiation rays 905, 906, 907 and 908 would be blocked leaving the high and mid frequency radiation to pass through as a solid beam of light having a diameter somewhat less than the incoming beam 900. In any event, it is apparent that high, low and band pass filters can be provided using either shield 420 or shield 425 or a combination thereof. It should also be remembered that successive shields having successively smaller apertures may be used to incrementally separate radiation.

Figures 14, 15, 16:
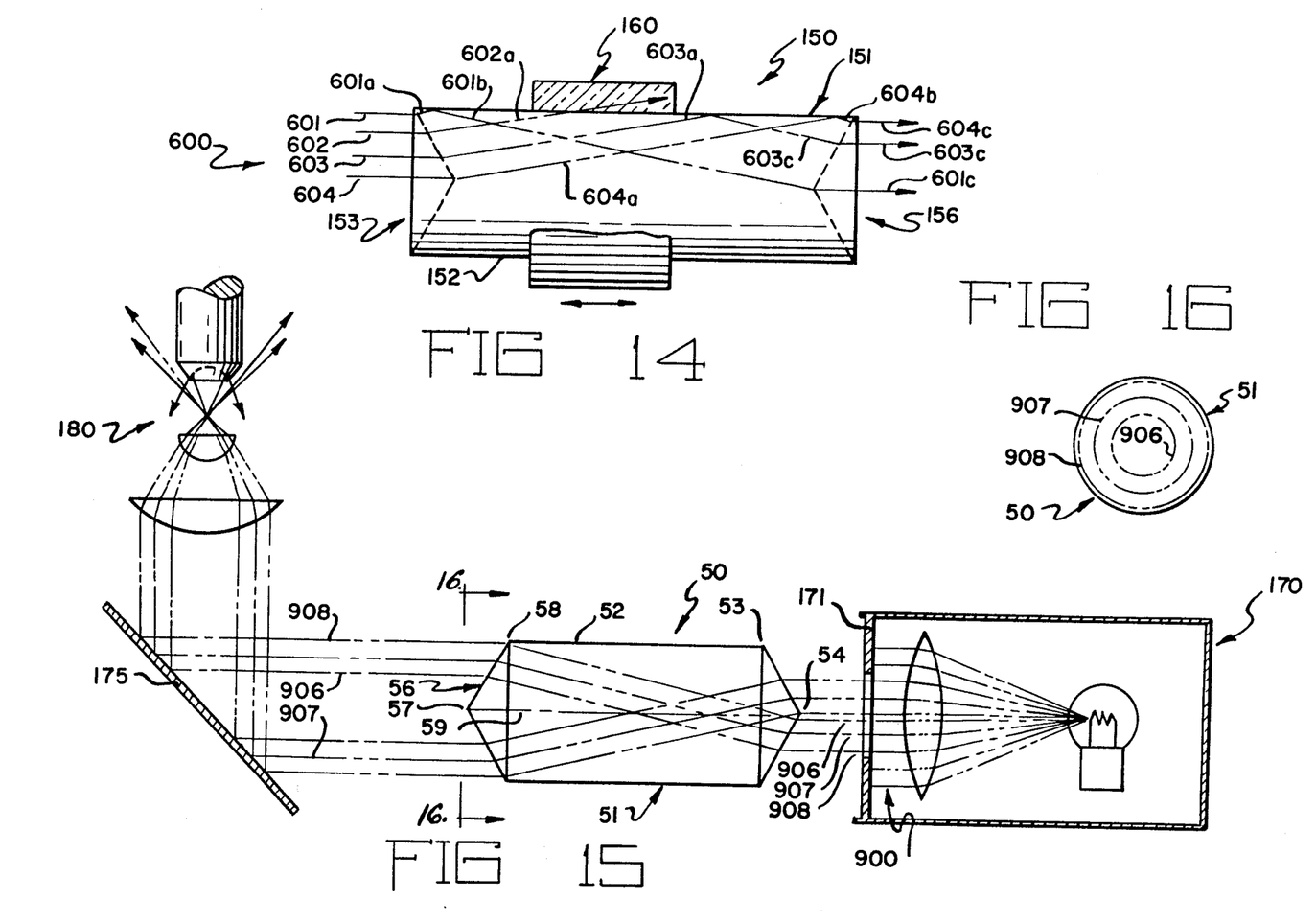
FIG. 14 is a schematic illustration of a band reject filter.
FIG. 15 is a schematic illustration of a system for dark field or color contrast microscopy.
FIG. 16 is a view in section of the output beam of light illustrated in FIG. 15 as viewed along lines 16—16 thereof.

Referring now to FIG. 14 there is disclosed a device 150 similar to that illustrated in FIG. 2 wherein a circular rod 151 having inwardly facing prism faces 153 and 156 has the outer surface thereof 152 internally reflective, whereby an incoming beam 600 is refracted at the face 153 toward the outer surface 152 and thereafter reflected by contact with the outer surface toward the output prism face 156 where the beam is refracted at the output face, as disclosed. In order for the device 150 to operate effectively as a high, low or band stop optical filter, it is necessary to provide a unit 160 in the form of a ring or collar movable longitudinally of the device 150. The unit 160 operates to permit refracted light from the face 153 to pass through the surface 152 rather than to be reflected thereby, for instance ray 602 is refracted (602a) at the face 153 and then passes through the unit 160 rather than being reflected. Examples of the unit 160 would be a device which wets the surface with a liquid or alternatively the unit 160 may be a soft or transparent plastic collar. By moving the unit 160 towards the input prism face 153 high frequencies are passed through the unit 160 and therefore are not present in the output beam. This is true since high frequency rays tend toward the beam perimeter and are refracted toward the surface 152 adjacent the input face 153; such as incoming ray 601 refracted (601a) then reflected (601b) by surface 152 and thereafter refracted (601c) by conical output face 156. Similarly, moving the unit 160 toward the output face 156 removes low frequency rays from the output beam, all as previously explained for parallel light having frequencies ranging from high at the periphery of the beam to low at the beam central axis. Clearly mid range frequencies are removed by locating unit 160 as shown. Also, the length of the unit 160 may be varied to eliminate larger ranges of frequencies or alternatively a very short unit 160 may be employed for selecting out very narrow frequency ranges.

Referring now to FIG. 15 there is disclosed a device 50 of the type previously described having a cylindrical body 51 circular in transverse cross section and with an outer cylindrical surface 52. An input conical face 53 is outwardly extending and has an apex 54 and a perimeter 55 circular in transverse cross section. Spaced from the input face 53 is an outwardly extending conical output prism face 56 having an apex 57 and a perimeter 58 circular in transverse cross section. The central axis of the device 50 lies on line 59 between the apexes 54 and 57.

A standard microscope illuminator 170 having a standard source of white light has the beam thereof reduced by a standard iris diaphragm 171 such that the diameter of the input beam is less than the perimeter 55 of the input conical prism face 53. The device 50 functions to produce an annulus of light at the output face 56 which is reflected into the microscope 180 by the mirror 175 thereof. The microscope 180 is standard in every characteristic and includes the usual lenses and condensers. The purpose of the device 50 is to provide a controllable annulus of light for dark field microscopy. At the present time, dark field microscopy requires expensive fittings for each brand of microscope, which are usually not interchangeable between microscopes of different manufacturers. By using the device 50, an inexpensive conversion of any standard microscope to one capable of use for dark field microscopy is accomplished without an expensive fittings and is perfectly interchangeable for microscopes of any design or make.

Additionally, color contrast microscopy is performed by inserting irises constructed with various color filters between the microscope illuminator 170 and the device 50 and between the output prism face 56 and the microscope 180. For instance, if an iris diaphragm (not shown) having a central aperture is constructed from a red color filter and is interposed between the microscope illuminator 170 and the device 50 and then a second iris diaphragm (not shown) constructed from a green color filter is interposed between the output prism face 56 and the microscope 180, the viewer looking in the microscope eyepiece will see a field in which the central circle is red surrounded by a green annulus. This occurs because in the first named filter, white light enters the center of the input prism face 53 and is refracted to the perimeter of the output face and then passes through the green filter whereas red color light enters at the perimeter of the input face 53 and exits through the center of the output face 56 and through the aperture in the green color filter, thereby providing the red center portion surrounded by the green annulus, both of which are adjustable.

Clearly, various combinations of color filters may be used to provide different desired results. Reference to FIG. 16 clearly shows the annular shape of the output beam of light emerging from the face 56 of the device 50. If instead of the diaphragm 171 blocking the light thereby reducing the effective diameter of the input beam there had been substituted the previously discussed red color filter, the annulus would have a red center surrounded by a white annular ring; additionally, if the beam of light having a red center and a white annular ring were then passed through a greem color filter having an aperture therein exactly coextensive with the red portion of the beam, then the beam as viewed by the observer in the microscope would be as previously described, that is a red circle surrounded by a green annulus.

A device 50 has been constructed in accordance with FIG. 1 of the drawings wherein a rod 4.0 cm in diameter of a synthetic organic resin transparent to optically visible electromagnetic radiation having an index of refraction of 1.5 was provided with outwardly extending conical prism faces 53 and 56, each having an included angle of 120°. The length from apex 54 to apex 57 was 12.2 cm and the device operated satisfactorily as previously described.

As seen therefore there has been described a plurality of prism devices each of which radially translates an incoming beam of substantially parallel radiation whereby the output beam is radially translated so that the center of the incoming beam is the periphery of the outgoing beam and the periphery of the incoming beam is the center of the outgoing beam. The outgoing beam is reverse reading with respect to the incoming beam and in some cases is rotated 180° with respect to the incoming beam. The radial translations are accomplished either by means of prisms wherein refraction alone occurs or by means of prisms wherein both refraction and reflection occurs or by means of reflectors wherein only reflection occurs.

Some of the radial translations occur across the central axis of the device, such as in that described in devices 50 and 400, while in other devices such as 150 and 200 the translations occur but never cross the internal central axis of the device. The devices are useful in constructing high, low and band pass filters for Fourier planes associated with usable light or other radiation such as electromagnetic or acoustics in which substantially parallel incoming beams have frequencies varying from the central portion of the beam radially outwardly to the periphery of the beam. In these cases, selected frequencies can be removed or otherwise selected out of the beam for other operations.

There have been disclosed high frequency filters, low frequency filters and band pass filters. Also, manipulation of spatial frequencies in an optical Fourier plane are achievable without distorting the optically visible beam of light by operating on the periphery of the beam to remove or otherwise alter the selected frequencies. Both low and high frequencies may be selected for manipulation in this manner. A combination of the devices illustrated in FIG. 11 or 12 with a device illustrated in FIG. 1 which is axially aligned and located downstream from the device of FIG. 11 or 12 results in a beam of optical light in which selected frequencies have been removed or otherwise manipulated and then the light again translated by the presence of the device 50 downstream to provide a beam of light at the output end of the device 50 which is oriented in exactly the same manner as the incoming beam to the device 400 but with selected information removed or otherwise altered. This specific combination of devices 400 and 50 has not been illustrated for brevity, but is an important combination to retranslate a manipulated beam to the original orientation.

Other uses of the device have been described in which high intensity laser beams can be radially translated to provide a significant increase in beam intensity at the central portion or an annular portion of variable radius, a use clearly applicable to laser drilling of small apertures and the like. An annular beam allows the drilling of larger holes with a lower energy requirement. A still further use of the present invention lies in dark field and color contrast microscopy, all as previously discussed. Another apparent use of the device is with multiple color filters arranged much in the same manner as the irises in the previously described color contrast microscopy in order to produce unusual visual effects.

While there has been described what at present is considered to be the preferred embodiments of the present invention, it will be understood that various alterations and modifications may be made herein without departing from the true spirit and scope of the present invention and it is intended to cover in the appended claims all such alterations and modificaations.

What is claimed is:

1. A system for selectively separating portions of radiation from a beam of substantially parallel radiation having a beam central axis and perimeter comprising a conical input prism face transparent to the radiation, a conical output prism face transparent to the radiation and longitudinally spaced apart from said input prism face and extending oppositely thereto, each of said input and output prism faces being discrete entities facing outwardly and having a perimeter circular in transverse cross section, and means associated with said prism faces for selectively separating portions of the radiation beam at the perimeter and adjacent thereto having at least a part thereof opaque to the radiation and positioned intermediate said input and output faces, said prism faces being longitudinally spaced apart a predetermined distance such that radiation entering said input prism at the perimeter thereof is concentrated toward the output prism face central axis and radiation entering said input prism face at the central axis is dispersed toward the output prism face perimeter thereby radially translating the beam to permit access to the central portion of the original beam at the perimeter of the translated beam and adjacent thereto.

2. The system set forth in claim 1, wherein said means has portions thereof opaque to the radiation and located exteriorly of said prism faces.

3. The system set forth in claim 1, and further comprising a device axially aligned with said output prism face for radially translating radiation emitted from said conical output prism face, thereby to reconstruct the original radiation beam with selected portions thereof separated.

4. The system set forth in claim 1, wherein said means is located intermediate the radiation source and said input prism face such that the diameter of the radiation beam entering said input prism face is less than the diameter of said prism face and the beam and said prism face are axially aligned, thereby to produce an annular beam from said output prism face.

5. A method of selectively manipulating portions of radiation from a beam of substantially parallel radiation comprising providing outwardly and oppositely extending discrete conical prisms having circular transverse cross sections positioned a predetermined distance apart and transparent to the radiation, directing the beam of radiation towards one of the prisms, and selectively manipulating only the outermost portions of the beam at predetermined positions intermediate the prisms and axially spaced therefrom by passing the portions of the beam through material opaque to the radiation, whereby radiation at the one prism perimeter is concentrated toward the other prism central axis and radiation at the one prism central axis is dispersed toward the other prism perimeter and selected portions of the beam are manipulated.

6. The method of claim 5, wherein manipulation is by passing the beam through an apertured shield opaque to the radiation.

7. The method of claim 6, wherein an apertured shield is intermediate the beam source and the one prism to produce a hollow annulus of radiation at the other prism.

8. The method of claim 5, wherein the beam is also passed through a color filter.

9. The method of claim 5, wherein the radiation is optically visible light and the manipulation occurs at a Fourier plane.

10. The system set forth in claim 1, wherein said input and output prism faces are axially aligned.

11. A system for selectively separating portions of radiation from a beam of substantially parallel radiation having a beam central axis and perimeter comprising a conical input prism face transparent to the radiation, a conical output prism face transparent to the radiation and longitudinally spaced apart from said input prism face and extending oppositely thereto, each of said input and output prism faces being symmetrically positioned about the beam central axis inwardly facing on a unitary cylindrical body and outer surface thereof reflecting inwardly radiation refracted from said input prism face, and means associated with said prism faces for selectively separating portions of the radiation beam at the beam perimeter and adjacent thereto by cooperating with said outer surface to render a preselected portion thereof transparent to the radiation to permit a preselected band of radiation to pass through said transparent portion to eliminate the preselected band from the radiation refracted by said output prism face, said prism faces being longitudinally spaced apart a predetermined distance such that radiation entering said input prism at the perimeter thereof is concentrated toward the output prism face central axis and radiation entering said input prism face at the central axis is dispersed toward the output prism face perimeter thereby radially translating the beam to permit access to the central portion of the original beam at the perimeter of the translated beam and adjacent thereto.

* * * * *